F. E. BAKER.
NUT AND BOLT LOCK.
APPLICATION FILED MAR. 28, 1916.
1,195,165.
Patented Aug. 15, 1916.
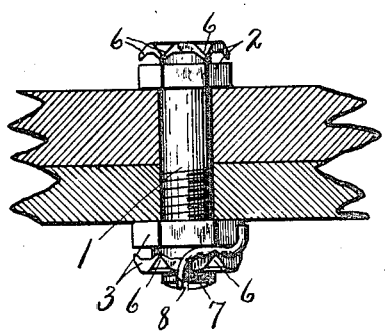
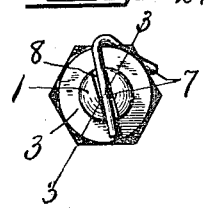
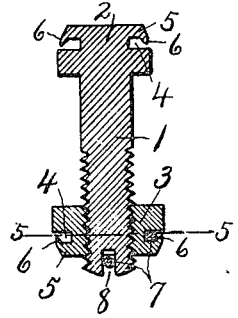
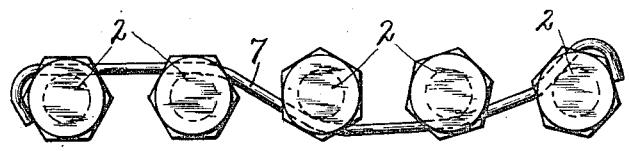
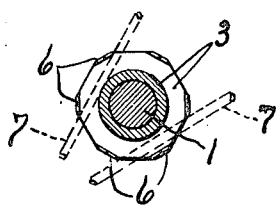
WITNESSES:
H. N. Hurst.
H. E. Chase
INVENTOR
F. E. Baker
BY Howard S. Hudson
ATTORNEY.

UNITED STATES PATENT OFFICE.

FRANK E. BAKER, OF SYRACUSE, NEW YORK, ASSIGNOR OF ONE-THIRD TO EARL C. DEVENDORF, OF SYRACUSE, NEW YORK.

NUT AND BOLT LOCK.

1,195,165.      Specification of Letters Patent.      Patented Aug. 15, 1916.

Application filed March 28, 1916. Serial No. 87,205.

*To all whom it may concern:*

Be it known that I, FRANK E. BAKER, a citizen of the United States of America, and resident of Syracuse, in the county of Onondaga, in the State of New York, have invented new and useful Improvements in Nut and Bolt Locks, of which the following, taken in connection with the accompanying drawings, is a full, clear, and exact description.

This invention relates to certain improvements in nut and bolt locks, and refers more particularly to the structure of the nut or bolt head for receiving the locking member to prevent accidental loosening of either the nut or bolt when adjusted for use. These bolts and nuts are usually made in automatic machines from bars of any suitable length, and one of the main objects of my invention is to provide the nut or bolt heads with annular grooves or radially projecting flanges simultaneously with the operation of cutting them to the desired lengths, for the purpose of receiving a suitable locking member and providing them with means whereby the locking member may be retained in place, the locking member being utilized to hold the nut or bolt against loosening when adjusted for use.

Other objects and uses will be brought out in the following description.

In the drawings Figure 1 is a side elevation of a bolt and nut embodying the features of my invention, as used for clamping two parts together, such parts being shown in section. Fig. 2 is an end view of the same bolt and nut showing the manner of locking them together against relative turning movement. Fig. 3 is a longitudinal sectional view of the same, taken on line 3—3, Fig. 2. Fig. 4 is an end view of a series of my improved bolts or cap screws shown as locked against turning by a single locking member. Fig. 5 is a transverse sectional view through the bolt and nut, taken on line 5—5, Fig. 3.

The bolt, as —1—, is shown as provided with an angular or multi-sided head —2— and a similarly formed nut —3—, each of which is provided with an annular groove —4— nearer to the outer end than to the inner end thereof to provide a comparatively thin radially projecting flange —5— at the outer end thereof, the angles or corners of which are bent or deflected inwardly partially across the groove to form lips —6— which project partially across the groove some distance from the base of such groove sufficient to receive a locking member, such as a wire —7—, between the lip and said base so that the lip will overhang the outer face of the locking member and thereby retain it in operative engagement with the nut against radial displacement. This groove may be formed by a suitable tool in the same machine in which the bolt or nut is made, and preferably in the same operation. The lips —6— may also be formed in the same machine by a suitable tool, not shown, which will press the corners inwardly, or they may be formed by simply striking the corners of the flange —5— with a hammer before or after the wire or locking member —7— is inserted into the groove.

When it is desired to lock the bolt and nut against relative turning, the threaded end of the bolt may be provided with a diametrically extending groove —8— which may be quickly produced by any suitable cutting tool for receiving a portion of the locking member —7—, the latter being preferably made of bendable wire so that when inserted in the groove —4— across the inner face of one or more of the lips —6—, a portion thereof may be bent to register with the groove —8— or to engage any other object which would prevent turning of the nut.

In securing the heads of cylinders, hand-hole plates and in many other classes of machines, it is common practice to use a series of cap screws or bolts arranged side by side, and in Fig. 4 I have shown such an arrangement of cap screws or bolts —2— having groove heads similar to that shown in Figs. 1, 2 and 3 for receiving a locking member —7— consisting of a single piece of wire extending successively through the grooves at the inner sides of the lips for locking all of the bolts against turning.

The lips —6— of both nuts and bolt heads are forced inwardly partly across the groove by pressure after the groove —4— is turned, leaving an intervening space between the points of the lips and base of the groove for the reception of the locking member —7— which may be passed between said base and one or more of the lips, and if such lips are not forced inwardly partly across the groove by a suitable tool during the operation of cutting the groove, they may be forced inwardly by a hammer blow, either before or after the locking member is inserted in said groove.

What I claim is:

1. A nut or bolt-head having an annular groove to receive a locking member, portions of said nut or head beyond the base of the groove being deflected partially across such groove to retain the locking member.

2. A nut or bolt-head having a circumferential groove, and lips extending transversely of the groove to retain a locking member in such groove.

3. An angular nut or bolt-head having a circumferential groove, and lips at the angles projecting partly across such groove to retain a locking member therein.

4. A nut or bolt-head having a circumferential groove nearer to its outer end than to its inner end, portions of the outer end having lips projecting partially across the groove to retain a locking member therein.

5. A nut or bolt-head having a radially projecting flange provided with a lip standing out from the main body to form an intervening passage for a locking member.

In witness whereof I have hereunto set my hand this 25th day of March 1916.

FRANK E. BAKER.

Witnesses:
H. E. CHASE,
ALICE M. CANNOD.